United States Patent [19]
Honda

[11] Patent Number: 5,369,592
[45] Date of Patent: Nov. 29, 1994

[54] THREE-DIMENSIONAL MACHINING METHOD

[75] Inventor: Kenichi Honda, Osaka, Japan

[73] Assignee: Kabushiki Kaisha F A Labo, Osaka, Japan

[21] Appl. No.: 966,460

[22] Filed: Oct. 26, 1992

[30] Foreign Application Priority Data

Nov. 19, 1991 [JP] Japan .................. 3-303171

[51] Int. Cl.$^5$ .................. G06F 15/46; G05B 19/403
[52] U.S. Cl. .................. 364/474.29; 318/572; 364/474.18; 364/474.31
[58] Field of Search .................. 364/474.29, 474.31, 364/474.35, 474.18, 474.2, 474.01–474.37; 318/572, 573

[56] References Cited

U.S. PATENT DOCUMENTS

| | | | |
|---|---|---|---|
| 3,866,179 | 2/1975 | McGee et al. | 364/474.18 X |
| 4,162,527 | 7/1979 | Kilbane et al. | 364/474.18 |
| 4,503,493 | 3/1985 | Burkhardt et al. | 364/474.18 X |
| 4,659,265 | 4/1987 | Kishi et al. | 364/474.18 X |
| 4,789,931 | 12/1988 | Kuragano et al. | 364/474.18 |
| 4,837,703 | 6/1989 | Kakazu et al. | 364/474.18 |
| 5,134,570 | 7/1992 | Nankaku | 364/474.29 X |
| 5,251,143 | 10/1993 | Maeda | 364/474.18 |

FOREIGN PATENT DOCUMENTS

| | | |
|---|---|---|
| 0075031 | 3/1983 | European Pat. Off. |
| 0264919 | 4/1988 | European Pat. Off. |
| 0314798 | 5/1989 | European Pat. Off. |

Primary Examiner—Joseph Ruggiero
Attorney, Agent, or Firm—Burns, Doane, Swecker & Mathis

[57] ABSTRACT

A three-dimensional machining method in which paths of the center of a machine tool are calculated from at least one defined curve to machine a surface which is smooth and includes the defined curve. For continuous machining of a first surface and a second surface, the intersection of a tool center path to machine the first surface and the offset surface of the second surface is calculated, and the intersection of a tool center path to machine the second surface and the offset surface of the first surface is calculated. Then, a tool center path to create a connecting surface between the intersections is generated.

12 Claims, 14 Drawing Sheets

BOUNDED MACHINING PATH

THREE-DIMENSIONAL MACHINING METHOD

BACKGROUND OF THE INVENTION

1. Field of the Invention

The present invention relates to a method of machining a workpiece three-dimensionally with a machine tool such as a milling cutter, and more particularly to a calculation control for generating a path of the machine tool.

2. Description of Related Art

Recently, computerized three-dimensional machining has been developed for practical use.

In the machining, a computer calculates a path of the center of a machine tool, and the tool moves in accordance with the calculated path to machine a surface.

A surface to be machined is defined by control factors, and a path of the tool center is calculated from the control factors. Then, the tool follows the calculated path. In a conventional method, three-dimensional data are used for accurate machining. More specifically, every cheek point on the surface to be machined is defined by x, y and z coordinates, and the three-dimensional data on all the points are stored in the computer. Then, a path of the tool center is calculated from the data, and the tool or a workpiece is moved to follow the path.

The tool center path calculation is based on intersection calculation. Calculation of the intersection of a line and a curved surface is herewith described. Generally, a curved surface cannot be entirely expressed by a single equation. FIG. 30 shows a conventional method of intersection calculation. A curved surface #s is divided into small planes (polygons) 1, 2, 3 - - - n, and every polygon is checked whether to intersect a line 1. In the example of FIG. 30, the intersection of the line 1 and the surface #s is located in polygon 21. In this way, where a curved surface intersects a line is figured out. In order to improve the accuracy of machining which uses the intersection calculation, a curved surface must be divided into as small polygons as possible. However, this results in charging the computer with such an enormous volume of processing that a 16-bit computer cannot handle or that even a large computer takes a long time to complete.

The volume of processing handled by the computer must be in accordance with the accuracy of the machine tool. If the machine tool has a low accuracy, minute calculation through an enormous volume of processing will be in vain. On the other hand, if the machine tool has a high accuracy, the computer must be large enough to make minute calculation, though the large computer cannot increase the machining speed.

Another issue in the machining is transference of machining from a surface to another. Referring to FIG. 31, it is a big issue at what timing the machine tool transfers from a path along a surface #i (indicated with arrow a) to a path along a surface #j. Conventionally, the z values of the surface #i and the surface #j are compared at every check point, and the machining is progressed along the surface which has a larger or a smaller z value. Whether selecting a larger z value or a smaller z value depends on the program preset by the operator. Additionally, tool interference must be checked at every check point. Thus, since the processing must be performed at every check point, the calculation speed is low. Moreover, the transference of machining cannot be performed at the accurate timing.

Referring to FIG. 31, when the center of the machine tool comes to a cheek point: $P_1$, the machine tool will interfere with the surface #j, that is, the machine tool will make a recession on the surface #j. When the center of the machine tool comes to a check point $P_2$, the machine tool will interfere with the surface #1. Therefore the transference of machining from the surface #i to the surface #j starts at a cheek point Pa immediately before the point $P_2$ and finishes at a point $P_4$ where the interference of the machine tool with the surface #i will not occur. In this way, however, the shadowed area in FIG. 31 is left unmachined.

SUMMARY OF THE INVENTION

An object of the present invention is to provide a three-dimensional machining method wherein a machine tool can perform accurate machining controlled by a computer which performs a small volume of processing with fewer data.

Another object of the present invention is to provide a three-dimensional machining method wherein a transferring point of machining from a surface to another can be judged through a small volume of processing.

In order to attain the objects, a three-dimensional machining method according to the present invention comprises a step of calculating, from at least one defined curve, center paths which a center of a machine tool will follow to machine a surface which is smooth and includes the defined curve.

In the method, what is entered in a computer is only data about at least one defined curve, and the computer is only required to store data about polygons which are used for intersection calculation which is a base of the tool path calculation.

Another three-dimensional machining method according to the present invention comprising, for continuous machining of a first surface and a second surface, the steps of calculating an intersection of a tool center path along the first surface and an offset surface of the second surface; calculating an intersection of a tool center path along the second surface and an offset surface of the first surface; and generating a tool center path to create a connecting surface between the intersections.

According to the method, when machining is to progress from a first surface to a second surface continuously, the intersection of a tool center path along the first surface and an offset surface of the second surface and the intersection of a tool center path along the second surface and an offset surface of the first surface are calculated in advance. Machining of the first surface is continued with no checks until the machine tool comes to the intersection of the tool center path along the first surface and the offset surface of the second surface. The machine tool starts creating a connecting surface at the intersection of the tool center path along the first surface and the offset surface of the second surface and finishes creating the connecting surface at the intersection of the tool center path along the second surface and the offset surface of the first surface. Thereafter, the machine tool follows the tool center path along the second surface.

BRIEF DESCRIPTION OF THE DRAWINGS

These and other objects and features of the present invention will be apparent from the following description with reference to the accompanying drawings, in which:

FIGS. 1 through 29 show an exemplary three-dimensional machining method according to the present invention;

FIG. 1 is a schematic view of a machining apparatus;

FIG. 2 is an explanatory view of the Cauchy's method used for intersection calculation;

FIG. 3 is a view showing a way of defining a curve;

FIG. 4 is a view showing a way of defining a plane curve;

FIG. 5 is a view showing a way of recognizing a plane curve;

FIG. 6 is a view showing another way of recognizing a plane curve;

FIG. 7 is an explanatory view of a section curve;

FIG. 8 is a view showing a way of defining a surface;

FIG. 9 is a view of a created surface;

FIG. 10 is an explanatory view of the created surface;

FIG. 11 is a view explaining interpolation:

FIG. 12 is a view of a plane which is a defined surface;

FIG. 13 is a view of a surface of revolution which is a defined surface;

FIG. 14 is a view of a conical surface which is a defined surface;

FIG. 15 is a view of an R-surface which is a connecting surface;

FIG. 16 is a view showing a direction of arcs of the R-surface;

FIG. 17 is a view showing a way of creating an surface among more than two surfaces;

FIG. 18 is an explanatory view of a machining path;

FIG. 19 is an explanatory view of a tool center path;

FIG. 20 is an explanatory view of a machining path;

FIG. 21 is an explanatory view of an offset point;

FIG. 22 is a view showing a way of generating a machining path;

FIG. 23 is a view showing transference of machining from a surface to another;

FIG. 24 is a view showing the transference of machining;

FIG. 25 is a view showing a case wherein the transference of machining is impossible;

FIG. 27 is a view showing continuous machining of some surfaces;

FIG. 28 is a view showing a way of bounding a surface;

FIG. 29 is a view showing a way of determining sequence in which surfaces are machined;

DETAILED DESCRIPTION OF THE PREFERRED EMBODIMENTS

An exemplary three-dimensional machining method according to the present invention is hereinafter described.

Machining Apparatus

Figure 1:
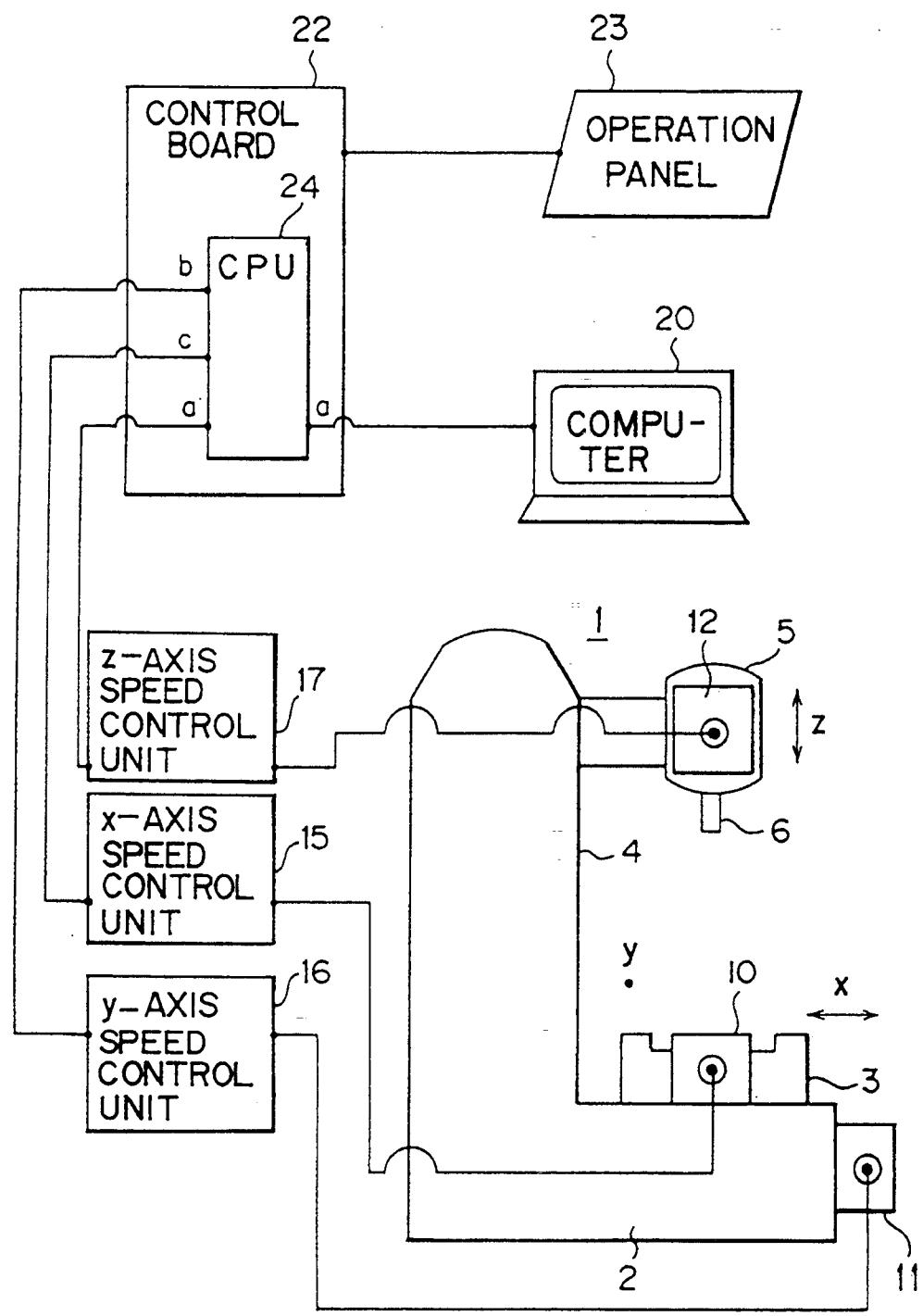

FIG. 1 is a schematic view of a machining apparatus. An apparatus body 1 has a work holder 3 on a base 2. A machine head 5 with a cutting tool 6 is disposed on a column 4. The work holder 3 is driven by an x-axis DC motor 10 and a y-axis DC motor 11 to move in the x and y directions. The machine head 5 is driven by a z-axis DC motor 12 to move in the z direction. The speed is controlled in accordance with signals which are sent from control units 15, 16 and 17 to the motors 10, 11 and 12.

An input/control system comprises a 16-bit computer 20 and a control board 22. The control board 22 has an operation panel 23 and incorporates a CPU 24. The CPU 24 receives data from the computer 20 through an input port a and sends signals to the control units 15, 16 and 17 through output ports b, e and d.

Intersection Calculation

Intersection calculation made by the computer 20 is described. According to the present invention, in dividing a surface to be machined into polygons, a conventional analytical method such as the Cauchy's method is used. Data required for defining a surface to be machined is processed from data about at least one defined curve which is provided as a control factor, and the Cauchy's method is used for the data processing. In other words, the location of the intersection of the curve and the surface is figured out by the Cauchy's method.

Figure 2:
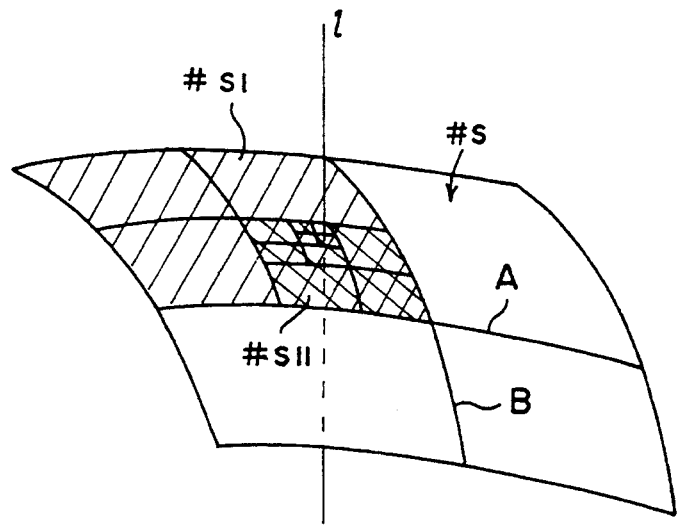

Referring to FIG. 2, a curved surface #s is divided into four polygons by line segments A and B, and which polygon intersects a line 1 is figured out. If the intersection is judged to be in a polygon #$s_1$ (shadowed from upper-right to lower-left), the polygon #$s_1$ is divided into four polygons in the same manner so that the location of the intersection will be figured out in more detail. If the intersection is judged to be in a polygon #$s_{11}$ (shadowed from upper-left to lower-right), the polygon #$s_{11}$ is further divided into four polygons so that the location of the intersection will be figured out more accurately. With repetition of the processing, the accuracy of the intersection calculation is improved.

Every time the processing is performed, the intersection calculation becomes four times as accurate as before the processing. When the processing is repeated n times, the intersection calculation becomes $4^n$ times as accurate as before the repetitions of processing. Thus, compared with a conventional intersection calculation method, accuracy can be achieved with a small volume of processing in this method.

Definition of a Curve

The following describes how to define a curve which is to be used as a control factor.

A curve is projected onto xy, xz and yz planes, and thereby the curve can be illustrated as plane curves on the respective planes. An and curve is formed by at least two of the three plane curves, and in this way, the curve is defined three-dimensionally by the and curve.

Figure 3:
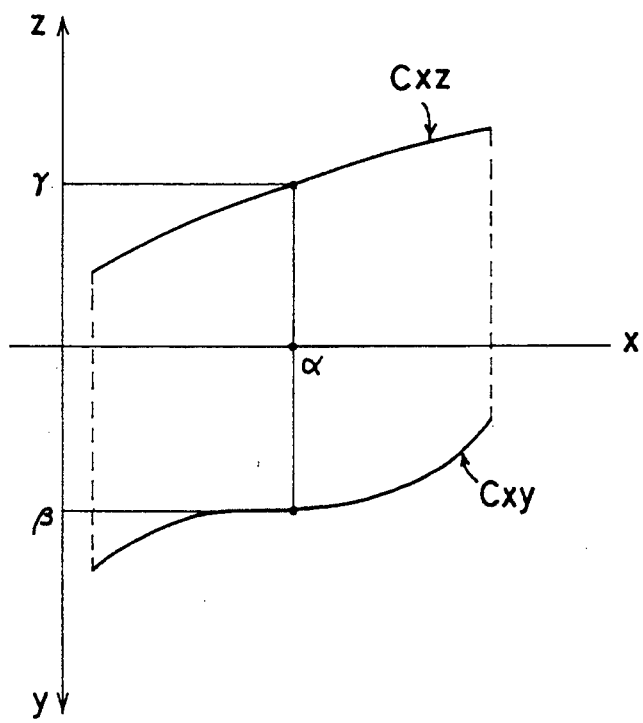

FIG. 3 shows how to define a curve C. The curve C is projected onto the xy, xz and yz planes, and thus obtained curves are denoted by Cxy, Cxz and Cyz respectively. In this example, the curve C is defined by an and curve formed by the curves Cxy and Cxz. From x=a, y=$\beta$ can be obtained with reference to the curve Cxy, and z=$\gamma$ can be obtained with reference to the curve Cxz. Thus, a point ($\alpha$, $\beta$, $\gamma$) on the curve C can be obtained.

Figure 4:
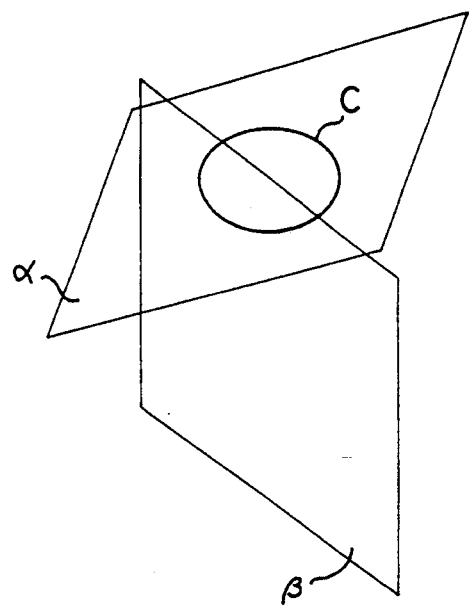

A curve can be defined three-dimensionally in this way. Next, calculation of the intersection of the defined curve and a plane is described. First, the curve is judged whether to be a plane curve or not. In a conventional three-dimensional machining method, any curve is handled as a space curve, that is, handled three-dimensionally and analytically, while in this method, a plane curve is handled two-dimensionally and algebraically. FIG. 4 shows a curve C, which is a circle on a plane $\alpha$. In the conventional method, the curve C is handled analytically. In this method, however, the curve C is handled two-dimensionally and algebraically because it is a plane curve (circle). There, calculating the intersection of the curve C and a plane $\beta$, the curve C is handled as a circle on the plane $\alpha$. Needless to say, algebraic processing is easier and more accurate than analytical processing.

The recognition of a plane curve is made from: (1) three views of the curve on the xy, xz and yz planes, or (2) location of all the points of the curve.

Figure 5:
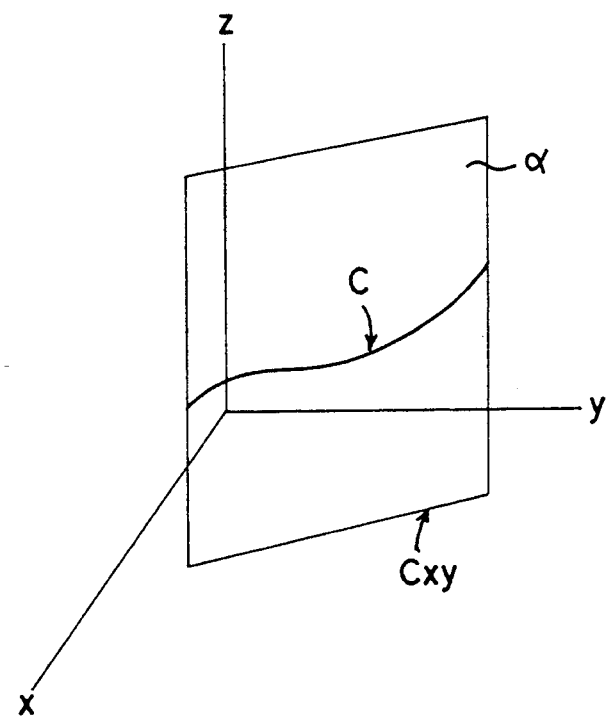

First, the recognition of a plane curve is tried to be made from the point (1). When a curve is projected onto the xy, xz and yz planes, if a straight line is obtained on one of the planes, it can be judged that the curve exists on a plane perpendicular to the line. For example, a curve C shown in FIG. 5 can be illustrated as a straight line Cxy on the xy plane, and therefore it can be judged that the curve C is a plane curve which exists on a plane $\alpha$ perpendicular to the line Cxy. Most plane curves which are used as control factors can be recognized in this way.

If the recognition of a plane curve cannot be made from the point (1), the point (2) is taken in considerations. Three points of the curve C are picked up to determine a plane $\alpha$, and it is judged whether all the other points of the curve C are located on the plane $\alpha$. If all the points of the curve C are located on the plane $\alpha$, the curve C can be judged to be a plane curve.

Figure 6:
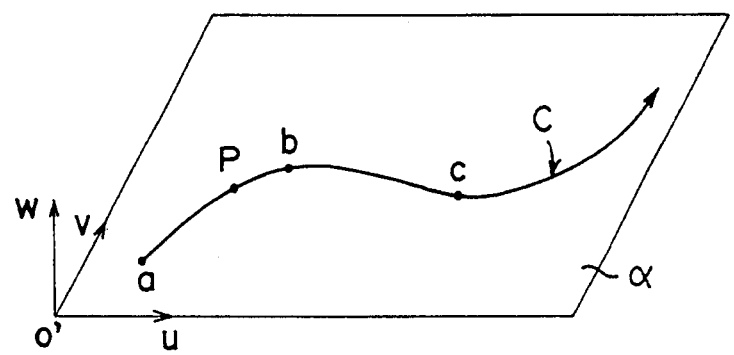

As shown in FIG. 6, three points a, b, c of the curve C determines a plane $\alpha$, and it is judged whether all the other points of the curve C exists on the plane $\alpha$. If the curve C is judged to be a plane curve on the plane $\alpha$, a u-axis and a v-axis are set on the plane $\alpha$ so that the carve C can be handled as a plane curve on the uv coordinate system plane. Further, a w-axis is set so that intersection calculation with respect to the curve C can be performed in the o'-uvw coordinate system.

Figure 7:
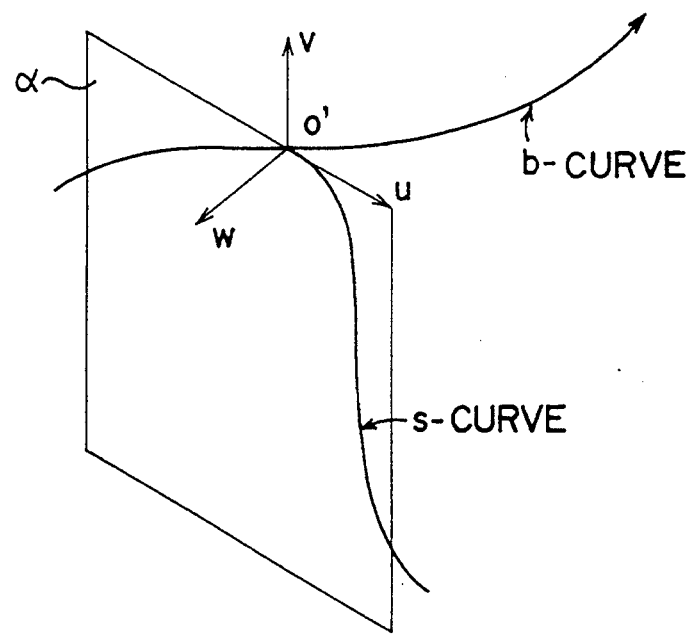

A section is a view obtained by cutting a final shape of a workpiece by a plane, and an outline of the section is referred to as section curve. Accordingly, the section curve is a plane curve. The section curve is used as a control factor. Referring to FIG. 7, a final shape of a workpiece is cut by a plane $\alpha$ such that the plane $\alpha$ intersects a curve b, and a curve s appears on the plane $\alpha$ as an outline of the section, i.e., a section curve. A u-axis and a v-axis are set on the plane $\alpha$ so that the curve s can be handled as a plane curve on the uv coordinate system plane, and further a w-axis is set so that intersection calculation can be performed in the o'-uvw coordinate system. Then, data according to the o'-uvw coordinate system are converted into those according to the o-xyz coordinate system.

Definition of a Surface

The following describes how to define a surface. A surface to be machined must be defined so as to include all curves which are control factors.

Definition of a Surface

Figure 8:
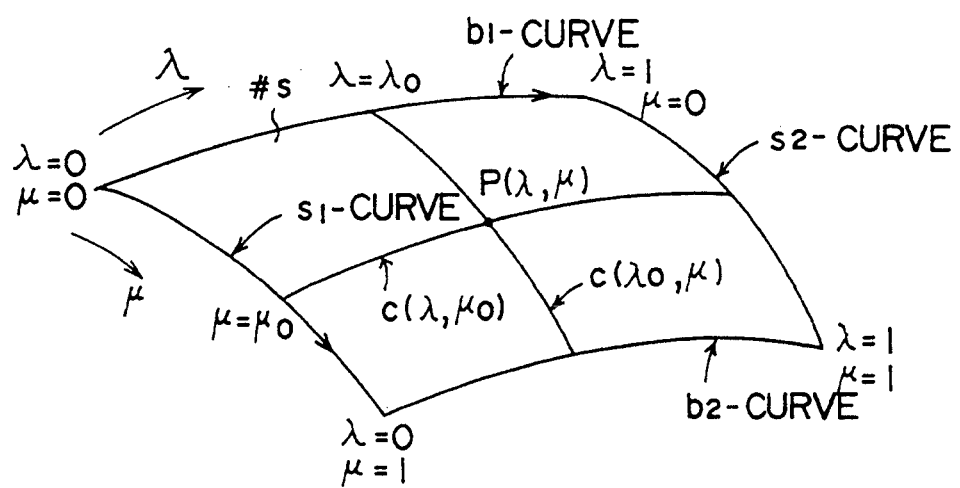

Referring to FIG. 8, how to define a surface is described. A surface #s is defined by variations $\lambda$ and $\mu$ which are non-parametric with respect to a coordinate system. The regions of $\lambda$ and $\mu$ are as follows:

$0 \leq \lambda \leq 1$
$0 \leq \mu \leq 1$

The surface #s is formed by curves in directions $\lambda$ and $\mu$. When values of $\lambda$ and $\mu$ are determined, a point P on the surface #s is determined. This is expressed by $P = P(\lambda, \mu)$. When $\lambda = \lambda o$, points $P(\lambda o, \mu)$ $(0 \leq \mu \leq 1)$ Form a curve on the surface #s extending in the direction of $\mu$. This curve is expressed by $c(\lambda o, \mu)$.

When $\mu = \mu o$, points $P(\lambda, \mu o)$ $(0 \leq \lambda \leq 1)$ form a curve on the surface #s extending in the direction $\lambda$. This curve is expressed by $c(\lambda, \mu o)$.

Curves $c(\lambda, 0)$ and $c(\lambda, 1)$ are referred to as $b_1$-curve and $b_2$-curve respectively. Curves $c(0, \mu)$ and $c(1, \mu)$ are referred to as $s_1$-curve and $s_2$-curve respectively.

A curve extending in the direction of $\lambda$ is referred to as b-curve, and a curve extending in the direction of $\mu$ is referred to as s-curve. The b-curve and the s-curve can be expressed as follows:

$b = b(\lambda)$
$s = s(\mu)$

Classification of Surfaces

Surfaces are classified into three kinds: (1) created surface, (2) defined surface and (3) connecting surface. In a conventional method, such classification of surfaces has not been done, and any surface has been handled as a set of points. According to the present invention, a surface is made based on at least one control factor (defined curve) and the intersection calculation using the Cauchy's method. The Following describes the created surface, the defined surface and the connecting surface.

(1) Created Surface

Figure 9:
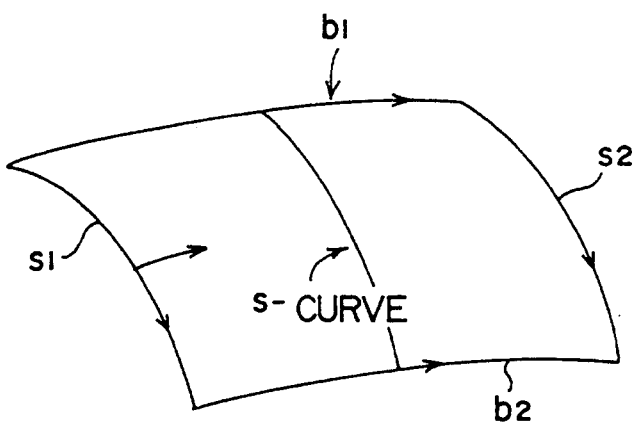

A created surface is a surface which is formed by interpolating curves among some defined curves (control factors). FIG. 9 shows a created surface. Curves $b_1$, $b_2$, $s_1$ and $s_2$ are control factors. By interpolating s-curves between the curves $s_1$ and $s_2$ along the curves $b_1$ and $b_2$, a created surface is formed as a set of s-curves.

Figure 10:
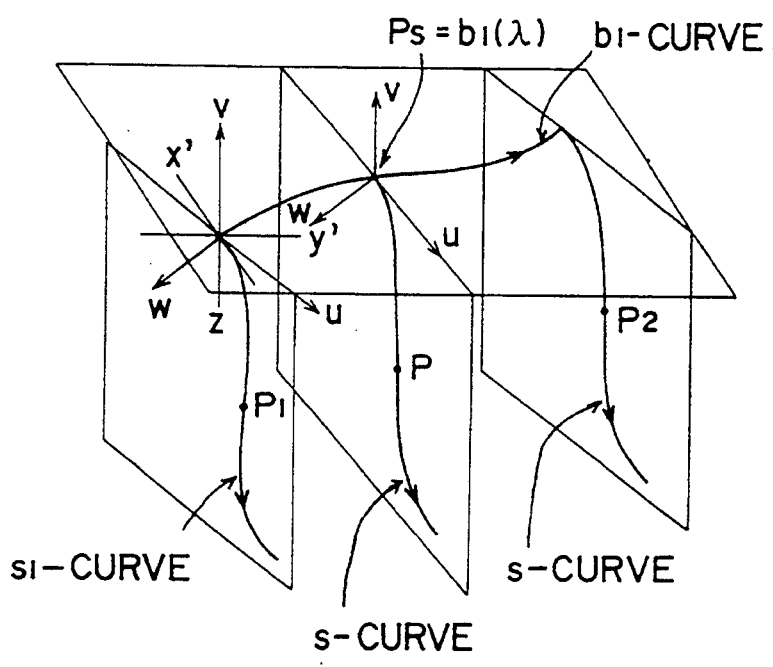

Specifically, if a condition of a point $P(\lambda, \mu)$ with respect to the directions of $\lambda$ and $\mu$ is determined, the surface is determined. In other words, as shown in FIG. 10, if an s-curve of $\lambda = \lambda$, i.e., $c(\lambda, \mu)$ is determined, the surface is determined.

The $b_1$-curve is defined in an o'-x'y'z' coordinate system $(0' = b_1(0))$. An s-curve is defined in a Ps-uvw coordinate system $(Ps = s(0))$. The Ps-uvw coordinate system is set for every s-curve.

An s-curve is determined from the $s_1$-curve or the $s_2$-curve and the location of Ps on the $b_1$-curve, i.e., $Ps = b_1(\lambda)$.

This processing is called interpolation. The interpolation is carried out such that a smooth curved surface is created and that the created surface includes the control factors. Specifically, the created surface must meet the following conditions:

if $Ps = b_1(0)$, $s = s_1$; and
if $Ps = b_1(1)$, $s = s_2$.

A point on the $s_1$-curve $(P_1 = s_1(\mu))$ and a point on the $s_2 =$ curve $(P_2 = s_2(\mu))$ are determined from the control factors. Then, points on s-curves $(P = s(\mu))$ can be interpolated between the points $P_1$ and $P_2$.

Now, interpolation is described in more detail. Interpolation is to determine a state on the way from a state of 0 to a state of 1 of a point or a curve. Accordingly, an equation expressing the variation of the state should be figured out for the interpolation.

Supposing that a point or a curve in the state of 0 (s=0) is $\xi_0$, that a point or a curve in the state of 1 (s=1) is $\xi_1$ and that a point or a curve in an in-between state is $\xi$, the interpolation can be expressed by the following equation:

$$\xi = \xi_0(0-1)\theta(s)\xi_1(1-0)\xi_0]$$

(0-1): variation from 0 to 1
(1-0): variation from 1 to 0
$\theta(s)$: interpolation function The interpolation function $\theta(s)$ must meet conditions that it has continuity from the state of 0 (s=0) to the state of 1 (s=1), that $\theta(0)=0$ and that $\theta(1)=1$. In other words, $\theta(0)=0$ and $\theta(1)=1$ must be met, while curves therebetween can be interpolated in any manner.

Figure 11:
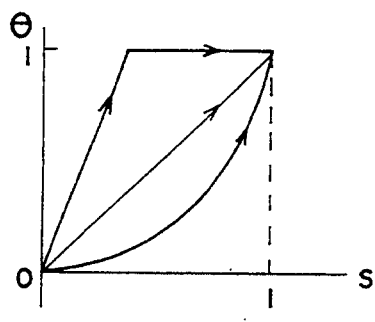

$\theta(s)=s$ (proportional interpolation) is the most ordinary interpolation function (see FIG. 11).

Some interpolation programs which have different interpolation functions are stored in the computer, and the operator selects one of them.

(2) Defined Surface

A defined surface is a surface which is formed by only defined curves. For example, a circular cylinder is a defined surface. Control factors of a created surface are only some defined b-curves and s-curves, while control factors of a defined surface are all the b-curves and s-curves.

(a) Plane

Figure 12:
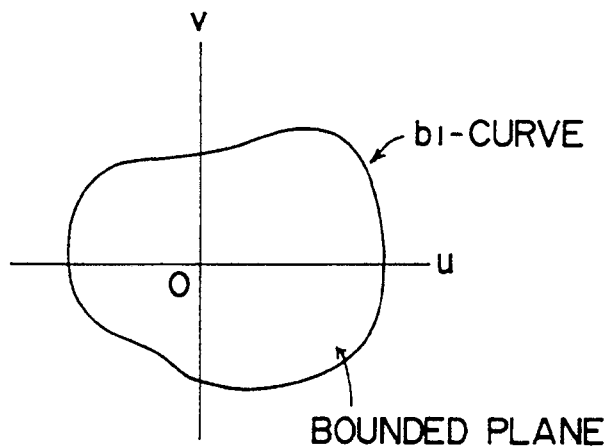

Planes are a kind of defined surfaces. Planes are classified into bounded planes and ordinary planes. An ordinary plane is a space plane which is not bounded, and its direction cosine is a control factor of the plane. A bounded plane is a region enclosed by a plane closed curve. In FIG. 12, a region enclosed by a closed curve ($b_1$-curve) is a bounded plane, and it is defined in a uv coordinate system.

(b) Surface of Revolution

Surfaces of revolution are a kind of defined faces. A surface of revolution is a surface which is formed by revolving a plane curve on an axis. In a case of a surface of revolution, all the b-curves are circles or arcs, and that becomes a control factor.

Figure 13:
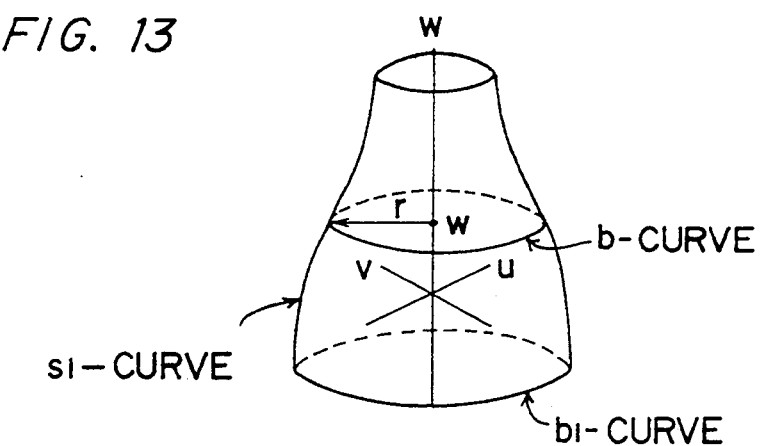

As shown in FIG. 13, an $s_1$-curve is defined on a uw plane, and a v-axis is set to form a uvw coordinate system. All the b-curves are circles on planes parallel with the uv plane. A point on the $s_1$-curve is expressed by:

$$s_1(\mu) = (u, w)$$

In the expression, u is equal to the radius r of a circle which is a b-curve.

(c) Conical Surface

Figure 14:
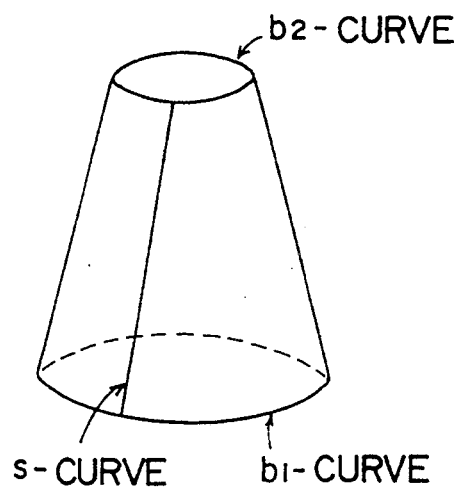

Conical surfaces are also a kind of defined surfaces. As shown in FIG. 14, a conical surface is a surface formed by two b-curves, $b_1$ and $b_2$ which have similar form and s-curves which are straight lines drawn between corresponding points of the similar curves $b_1$ and $b_2$. Especially when the curves $b_1$ and $b_2$ are congruent, the surface becomes a cylindrical surface.

Each s-curve is a line between a point on the $b_1$ curve (Ps=$b_1(\lambda)$) and a point on the $b_2$ curve (Pc=$b_2(\lambda)$). Accordingly, a point P on the s-curve can be expressed as follows:

$$P = Ps + \epsilon(PC - Ps)$$

$$0 \leq \epsilon \leq 1$$

In other words, the s-curve is a set of points P. All the b-curves and s-curves of a conical surface are control factors. The $b_1$-curve is defined on a uv plane, and further a w-axis is set to form a uvw coordinate system.

As described above, the $b_1$-curve of a defined surface is defined in the o'-uvw coordinate system, and intersection calculation is performed in the o'-uvw coordinate system. Then, the data based on the o'-uvw coordinate system are converted into those in the o-xyz coordinate system. Such classification of surfaces has not been used in any conventional three-dimensional machining method, and therefore any surface has been defined in the o-xyz coordinate system. In such a conventional method, the accuracy of the intersection calculation is lower than that of the present invention. For example, although every b-curve of a surface of revolution is a circle, the b-curve has been handled as a polygon almost a circle in a conventional method. Therefore, the speed and the accuracy of the intersection calculation are low. On the other hand, in the method of the present invention, the intersection calculation is performed in the o'-uvw coordinate system, and every b-curve of a surface of revolution can be handled as a circle. Therefore, the speed and the accuracy of the intersection calculation are high.

(3) Connecting Surface

A connecting surface is a surface which is created at the intersection of two surfaces to connect the two surfaces smoothly. The most ordinary connecting surface is an R-surface. The R-surface is a curved surface which is formed by arcs extended in a certain direction. The R-surface must be in contact with two surfaces which are to be connected, and the direction of the arcs and the radius of curvature are control factors of the R-surface.

Figure 15:
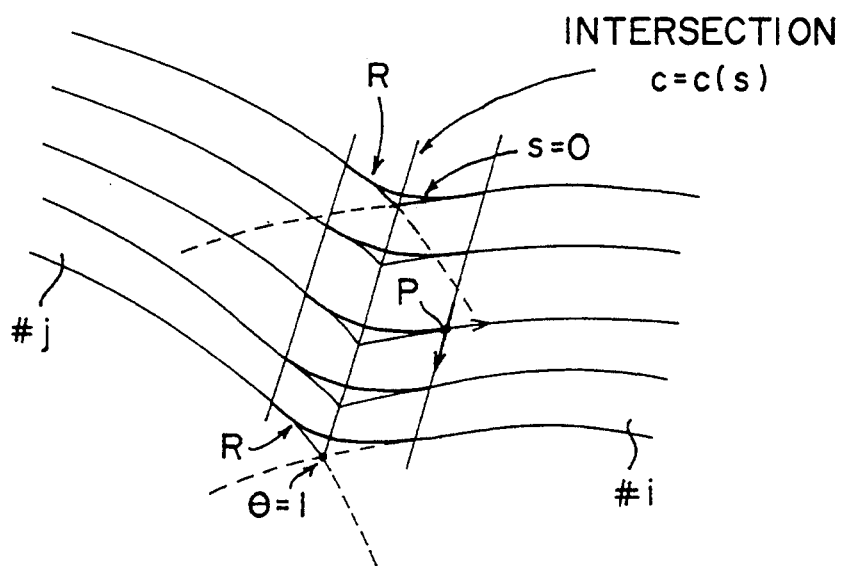

FIG. 15 shows an R-surface which connects two surfaces #i and #j. The intersection of the two surfaces #i and #j is expressed by c=c(s).

(a) Contact of the R-surface with the Two Surfaces

Here, that the R-surface is in contact with the surface #i means that the R-surface and the surface #i have a common tangent plane at the contact point P. A plane which extends in the direction of arcs and includes the contact point P is a tangent plane of the R-surface and the surface #i at the point P, which means that the R-surface is in contact with the surface #i. The R-surface is in contact with the surface #j in the same manner.

(b) Direction of Arc

Figure 16:
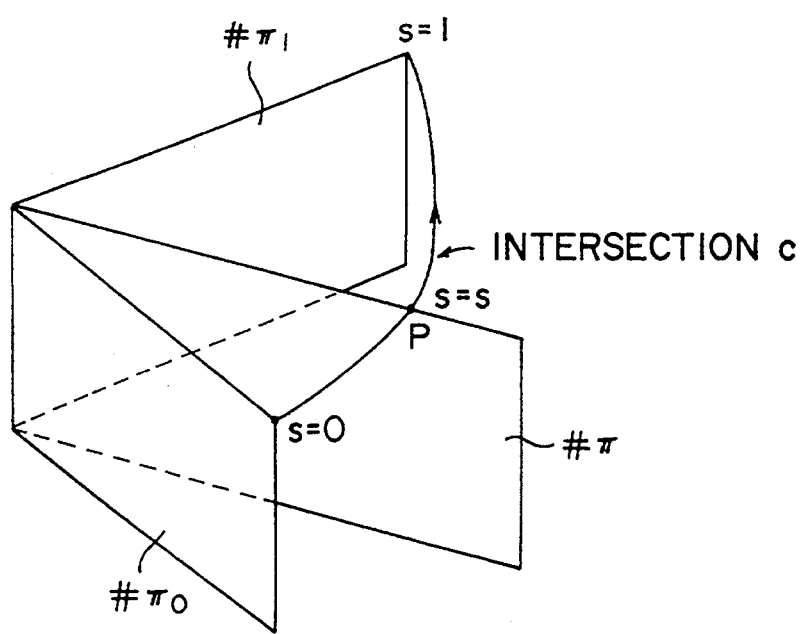

The direction of an arc is defined as a plane #$\pi$ on which the arc exists. If no commands on the direction of arcs are given, the direction of arcs is automatically set to be the normal plane of the intersection of the two surfaces #i and #j. Referring to FIG. 16, the direction of an arc at an N-surface starting point (s=0) is defined as a plane #$\pi_0$, and the direction of an arc at an R-surface finishing point (s=1) is defined as a plane #$\pi_1$. Then, the direction of an arc at an in-between point is defined as a plane #π which includes the intersection of the planes #π₀ and #π₁ and a point existing on the intersection c of the surfaces #i and #j.

(c) Radius of Curvature

Supposing that the radiuses of curvatures in a stare of s=0 and in a state of s=1 are $V_0$ and $V_1$ respectively, the radius of curvature V at a point P (s=s) is expressed as follows:

$$V \leq V_0 + \theta(s)(V_1 - V_o)$$

$\theta(s)$: interpolation function

On the plane #π extending in the direction of an arc, a u-axis and a v-axis are set, and an o'-uvw coordinate system is formed. Thereby, the intersection of the plane #π and the surface #i will be a curve on the uv plane. Similarly, the intersection of the plane #π and the surface #j will be a curve on the uv plane. Accordingly, an arc of the R-surface must be created on the uv plane. In this way, definition of the R-surface can be handled two-dimensionally. At that time, the plane extending in the direction or an arc and the radius of curvature are control factors.

Next, how to create an R-surface among more than two surfaces is described.

There may be a case in which creating an R-surface between neighboring first and second surfaces is impossible but creating an R-surface between the first surface and a third surface which is next to the second surface is possible. In this case, if it is possible to designate surfaces to be connected with each other by an R-surface, the first and the third surfaces can be connected by an R-surface.

Figure 17:
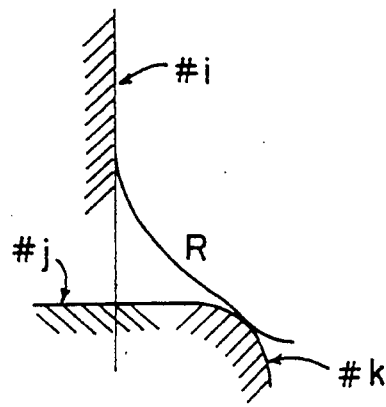

Referring to FIG. 17, it is impossible to create an R-surface between a surface #i and a surface #j, but it is possible to create an R-surface between the surface #i and a surface #k. In this case, the surface #j is not machined.

Machining

A tool center path is generated by connecting offset points from a surface to be machined. Conventionally, offset points are calculated from all check points on the surface to be machined, and the tool center path is generated by connecting the offset points. According to the present invention, some offset points are calculated from some defined points on the surface, and the tool center path is generated by interpolating points among the calculated offset points. Machining of the surface must be achieved so as to meet control factors of the surface. Specifically, offset, points corresponding to the control factors must be accurately calculated, not be interpolated. Occasionally, the machining tool is moved in different directions to machine a surface, and the machining tool passes the same point a plural number of times. The interpolation must be carried out such that the same surface can be made by every machining.

Classification of Machining

A path of the working end of a machine tool on a surface is referred to as machining path, and a path of the center of the machine tool is referred to as tool center path. Machining is carried out such that the machining path or the tool center path will meet predetermined conditions. The machining is classified into three kinds according to the conditions.

(a) Machining Wherein a Machining Path Exists on a Plane

Figure 18:
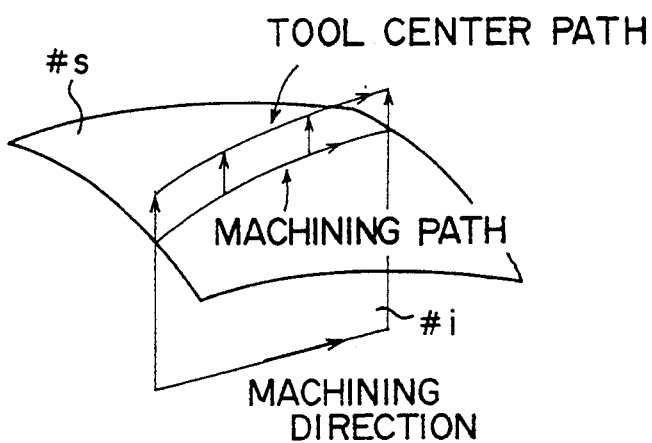

As shown in FIG. 18, if a machining path is a plane curve which exists on a plane #i, the machining path is the intersection of the plane #i and a surface #s to be machined. Offset points from some points of the machining path are calculated, and the corresponding tool center path can be obtained by interpolating points among the calculated offset points. If the plane #i is perpendicular to the xy plane, the machining is called horizontal machining. If the plane #i is parallel with the xy plane, the machining is called vertical machining.

(b) Machining Wherein a Tool Center Path Exists on a Plane

Figure 19:
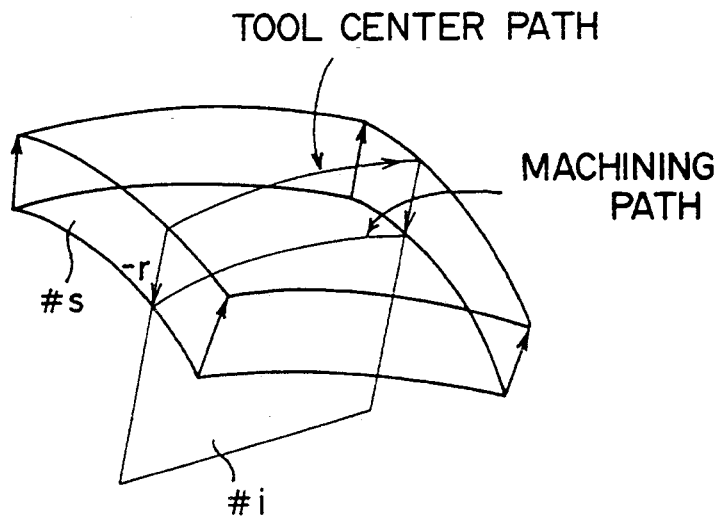

As shown in FIG. 19, if a tool center path exists on either one of the xy, xz and yz planes, the tool center path is the intersection of a plane #i on which the tool center path exists and an offset surface from a surface #s. The corresponding machining path can be obtained by offsetting the tool center path by −r.

Since the tool center path exists on one of the xy, xz and yz planes, x, y or z data are fixed. Therefore the tool center path can be defined as a plane (two-dimensional) curve. In converting the data into NC control data, G code (G02, G03) which is a command to draw an arc is used. Thus, it is possible to generate a tool center path with use of fewer data.

(c) Machining Wherein a Machining Path Is a Curve in the Directions of λ or μ

Figure 20:
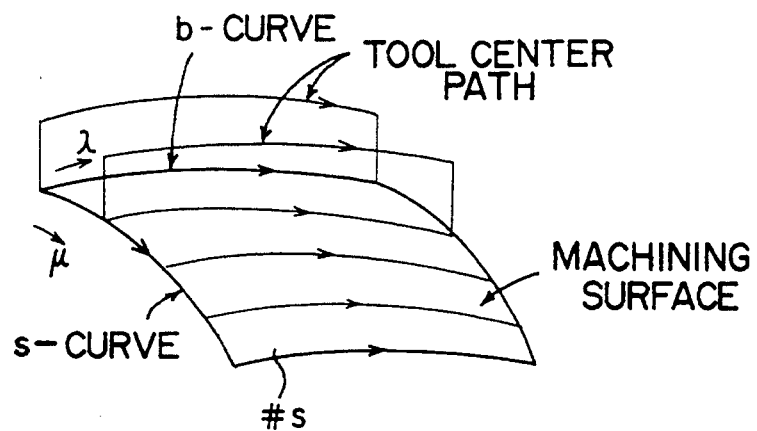

A surface #s shown in FIG. 20 is formed by curves in the directions of λ and μ. If a curve in the direction of λ, i.e., b-curve or a curve in the direction of μ, i.e., s-curve is a machining path, a curve formed by offset points from the b-curve or the s-curve becomes the corresponding tool center path.

In any case of (a), (b) and (c), only limited offset points are calculated to generate a tool center path. What is required to calculate the limited offset points is data only about limited points of a surface to be machined.

Offset Point

Figure 21:
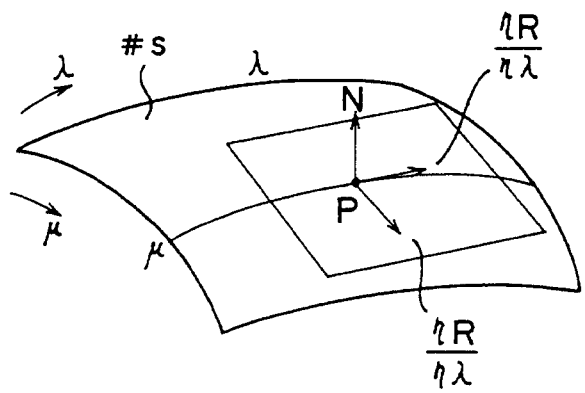

Referring to FIG. 21, how to calculate an offset point is described. An offset point $P^r$ from a point P on a surface #s to be machined is defined as a point which is off the point P with a distance r in the direction of the normal of the point P. The point P can be expressed by:

$$P = P(\lambda, \mu)$$

The point P can be expressed by a function of two variations λ and μ, and the function has a partial differential coefficient on the premise that the surface #s is smooth.

The normal vector N is expressed as follows:

$$N' = (\eta R/\eta \lambda) \times (\eta R/\eta \mu)$$

$$N = (N'/|N'|) \times \epsilon$$

ε: offset direction

Accordingly, the point $P^r$ can be expressed by:

$$P^A = P + r \cdot N$$

Determination of a Curve

A tool center path is determined by connecting offset points calculated by the Cauchy's method. The tool center path must be determined so as to meet the following two conditions: (a) including the control factors, and (b) machining out the same surface even after repeated machining in different directions.

Since the computer stores data about the control factors, the condition (a) can be surely met.

Connecting offset points is not enough to determine the tool center path which meets the condition (b). A curve which becomes a tool center path is determined from a sequence of points and kind of machining. Tool center paths determined in this way must achieve the same surface regardless of the selection of the points and the kind of machining.

Since a point P on the surface is defined by $\lambda$ and $\mu$, a curve should be determined so as to be limited by $P(\lambda, \mu)$. This does not mean that a ROM of the computer stores data about $P(\lambda, \mu)$.

A machining path is a curve on the surface and can be calculated by the Cauchy's method. Offset points are calculated from the curve (machining path), and an offset point $P^r$ can be obtained from a point P on the surface. Accordingly, the point $P^r$ can be expressed by $\lambda$ and $\mu$.

Figure 22:
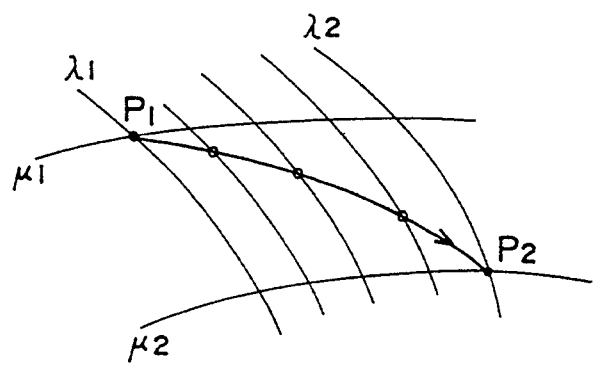

As shown in FIG. 22, generation of a machining path requires interpolation between points $P_1$ and $P_2$ which are on the surface to be machined, and generation of a tool center path requires interpolation between offset points $P_1^r$ and $P_2^r$.

Supposing $P_1 = P(\lambda_1, \mu_1)$ and $P_2 = P(\lambda_2, \mu_2)$, a curve between the points $P_1$ and $P_2$ can be expressed as follows:

$$c = c(s)$$

$$P_1 = c(0)$$

$$P_2 = c(1)$$

$$|\lambda_1 \times \mu_2| \geq |\mu_1 \times \mu_2|$$

Thus, the curve between the points $P_1$ and $P_2$ can be expressed with generality. In this case, $\lambda$ can be expressed as follows:

$$\lambda = \lambda_1 + s(\lambda_2 - \lambda_1)$$

By defining the intersections of s-curves and the surface to be machined as $P = c(s)$, the interpolation between the points $P_1$ and $P_2$ is made. Accordingly, the interpolation between the offset points $P_1^r$ and $P_2^r$ is made.

Transference of Machining between Surfaces

Figure 23:
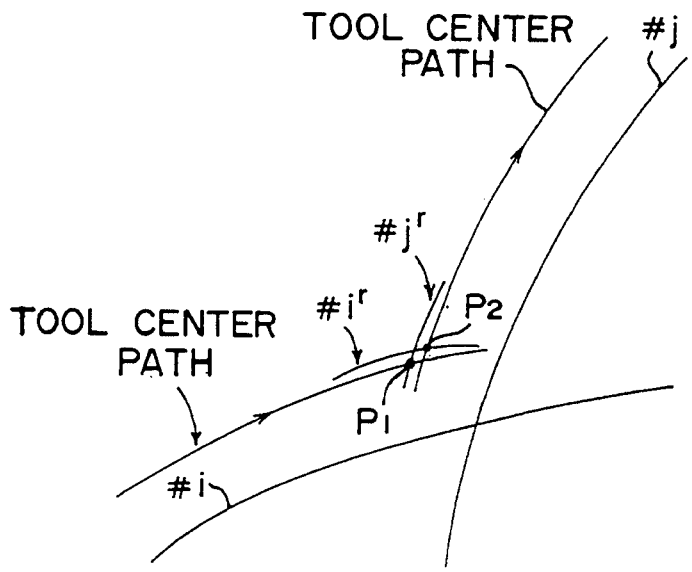
Figure 31:
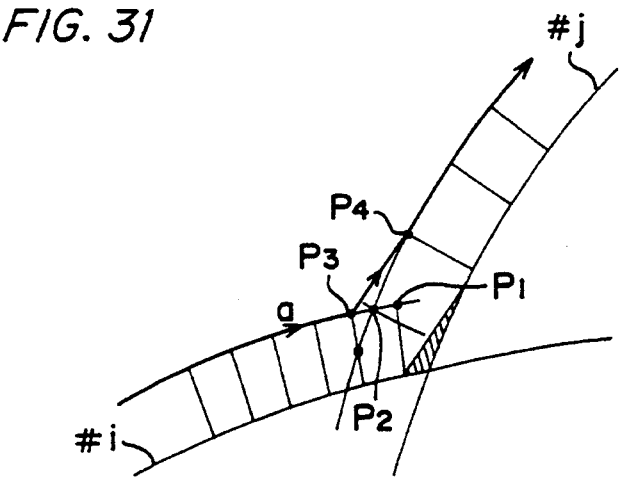
FIG. 31 is a view showing how machining transfers from a surface to another in a conventional machining method.

In machining two surfaces continuously, a transference point must be figured out. In a Conventional method, calculation of the transference point is made on every check point based on three-dimensional data about x, y and z values (see FIG. 31), FIG. 23 shows the manner of transference according to the present invention. In the figure, machining is to transfer from a surface #i to a surface #j. According to the present invention, the intersection $P_1$ of an offset surface #$j^r$ of the surface #j and a tool center path along the surface #i is calculated in advance, and the machining of the surface #i is performed with no checks until the machine tool comes to the intersection $P_1$. Thereby, the machining speed is increased. The intersection $P_2$ of an offset surface #$i^r$ of the surface #i and a tool center path along the surface #j is calculated, and machining is progressed to make a connecting surface between the point $P_1$ and the point $P_2$. In this way, transference points $P_1$ and $P_2$ can be accurately calculated, and the unmachined area can be remarkably decreased. In addition, the tool interference calculation is practically made when the intersection $P_1$ is calculated. The intersection $P_1$ is also a limit point where the tool interference with the surface #i can be prevented. The calculation of the point $P_1$ is made by the Cauchy's method, and therefore the calculation speed is much higher than that of the conventional method.

Figure 24:
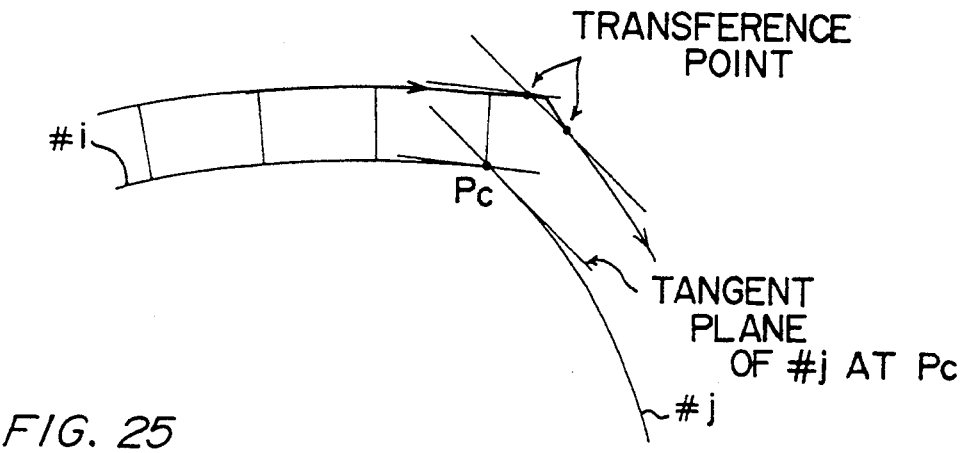

If no intersection exists between a tool center path and an offset surface of a surface to which the machining to transfer, the tool center path and the offset surface are extended to calculate a transference point. FIG. 24 shows such a case. In the case of FIG. 24, the machining transfer from a surface #i to a surface #j. Pc is the intersection of continuous machining paths on the surfaces #i and #j. The tool center path corresponding to the machining path on the surface #i is extended, and an offset plane of a tangent plane of the surface #j at the intersection Pc is extended. Then, the intersection of the extended tool center path and the extended offset plane is calculated as the transference starting point. Similarly, the tool center path corresponding to the machining path on the surface #i and an offset plane of a tangent plane of the surface #i at; the intersection Pc are extended, and the intersection of the extended tool center path and the extended offset plane is calculated as the transference finishing point.

Figure 25:
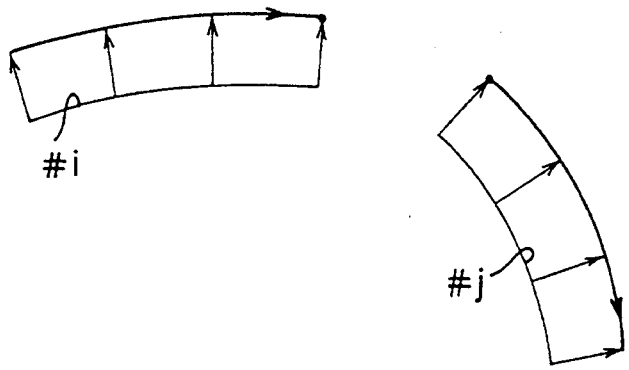

As shown in FIG. 25, if no intersection exists between surfaces #i and #j, continuous machining is not performed. After machining the surface #i, the surface $\pi j$ machined.

As described above, the method according to the present invention is based on total handling of curves and surfaces, not individual handling of machining points. This is because in the method of the present invention, accurate intersection calculation among curves and surfaces is made possible by adopting an analytical method such as the Cauchy's method.

In a conventional method, the operator must designate a way of transference of machining. Specifically, z values are compared at every cheek point, and selection of a higher or a lower value to determine a machining path is according to the way of transference of machining designated by the operator (see FIG. 31). In the conventional method, there are some eases in which designation of the way of transference is impossible. For example, if a surface to which the machining is to transfer is a vertical plane, the z value comparison is impossible, and another way must be taken to determine the machining path. Moreover, comparing z values at every check point increases the volume of processing and accordingly decreases the processing speed.

According to the present invention, on the other hand, the operator does not have to designate a way of transference of machining. Determination of a machining path is made not by comparing z values but by calculating intersections among curves and surfaces, and therefore the processing speed is greatly increased.

The transference of machining is made as follows according to the present invention.

(1) Transference to a Surface Which is Not a Vertical Plane

As shown in FIG. 23, a machining path on each surface is calculated, and transference is performed between the intersections $P_1$ and $P_2$.

(2) Transference to a Vertical Plane

Figures 26A, 26B:
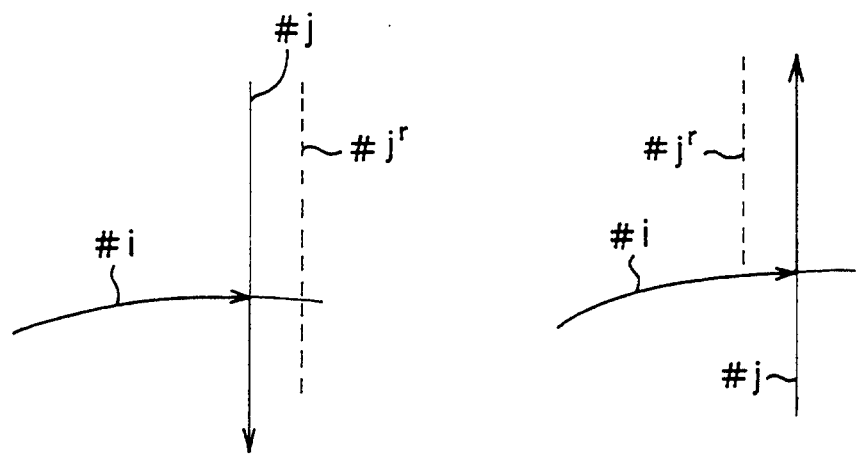
FIGS. 26a and 26b are views showing the transference of machining from a surface to a vertical plane.

FIGS. 26a and 26b show transference of machining from a surface #i to a vertical plane #j. Whether the machining is to transfer from the surface #i upward or downward along the vertical plane #j is judged by detecting the intersection of a machining path on the surface #i and the vertical plane #j and the intersection of the machining path and an offset surface #j$^r$ of the vertical plane #j. Referring FIG. 26a, the machining path intersects the vertical plane #j before the offset surface #j$^r$, and in this case, it is judged that the machining is to proceed downward along the vertical plane #j. Referring to FIG. 26b, the machining path intersects the offset surface #j$^r$ before the vertical plane #j, and in this case, it is judged that the machining is to proceed upward along the vertical plane #j.

Continuous Machining of Some Surfaces

Figure 27:
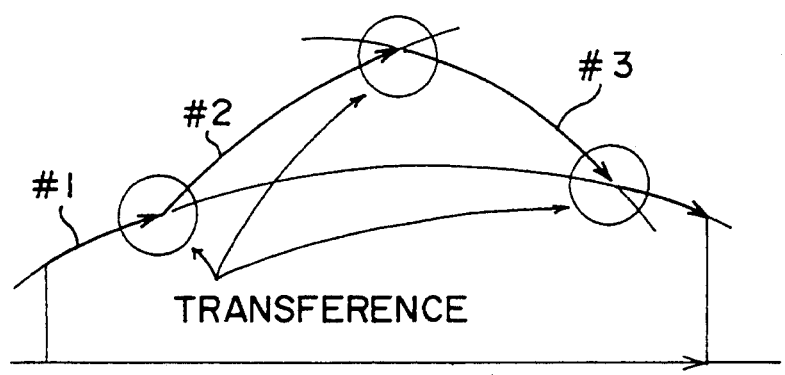

FIG. 27 shows continuous machining of surfaces #1, #2 and #3. The sequence in which the surfaces are machined is determined, and the above-described transference from a surface to another is repeated. In the case of FIG. 27, the machining is continued so that the surfaces #1, #2, #3 are machined from #1, #2, #3 and then back to #1.

Now, a way of eliminating the necessity for the operator to designate the sequence of surfaces is discussed. In some cases, it is impossible to designate the sequence in which surfaces are machined. Unless the surfaces are bounded, connection of the surfaces cannot be determined. Only if the surfaces are bounded, machining paths on the respective surfaces can be connected with each other at the ends so as to form a curve. In other words, a big issue is how to bound a surface. A way of bounding a surface is to bound the surface by a curve thereon.

Figure 28:
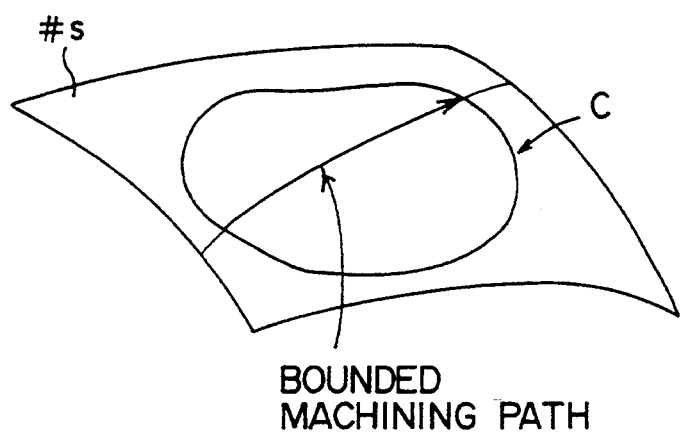
Figure 29:
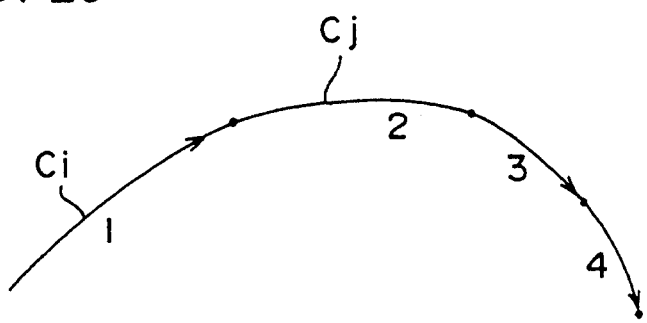
Figure 30:
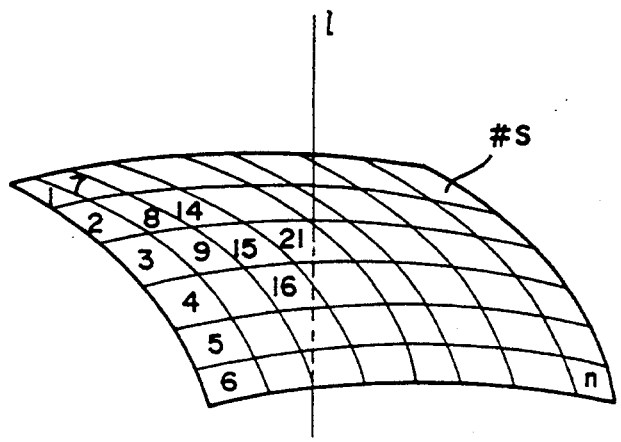
FIG. 30 is a view showing a conventional intersection calculation method.

For example, as shown in FIG. 28, a closed curve C on a surface #s bounds the surface #s. A curve on the surface #s which is a possible machining path is divided by the closed curve C. If the part of the curve which is inside of the closed curve C is determined as the machining path, the surface #s can be bounded. By using the intersection between surfaces as the closed curve C, any surface can be bounded, and the sequence in which a machining path on one surface follows another can be automatically determined. Specifically, as shown in FIG. 29, an end of a curve Ci becomes an end of another curve Cj, and thus, the curves Ci and Cj are connected. By repeating this process, all the curves can be connected automatically, and it is no longer necessary to designate the sequence in which surfaces are machined.

Although the present invention has been described in connection with the preferred embodiment above, it is to be noted that various changes and modifications are possible to a person skilled in the art. Such changes and modifications are to be understood as being within the scope of the present invention.

What is claimed is:

1. A three-dimensional machining method for machining a workpiece, wherein machining of the workpiece is transferred from a first defined surface to a second defined surface continuously and smoothly, said three-dimensional machining method comprising the steps of:
   calculating an intersection of a tool center path to machine the first defined surface and an offset surface of the second defined surface;
   calculating an intersection of a tool center path to machine the second defined surface and an offset surface of the first defined surface;
   generating a tool center path to create a connecting surface between the intersections; and
   machining the workpiece in accordance with the generated tool center path.

2. The three-dimensional machining method of claim 1, wherein the tool center path to machine the first defined surface does not intersect with the tool center path to machine the second defined surface.

3. The three-dimensional machining method of claim 1 wherein each of the intersection calculating steps is performed in accordance with Cauchy's method.

4. The three-dimensional machining method of claim 3, further comprising the step of machining a workpiece in accordance with the generated connecting tool center path.

5. The three-dimensional machining method of claim 4, wherein the tool center path to machine the first surface does not intersect with the tool center path to machine the second surface.

6. The three-dimensional machining method of claim 4, wherein each of the intersection calculating steps is performed in accordance with Cauchy's method.

7. A three-dimensional machining apparatus for machining a workpiece, wherein machining of the workpiece is transferred from a first defined surface to a second defined surface continuously and smoothly, said three-dimensional machining apparatus comprising:
   means for calculating an intersection of a tool center Oath to machine the first defined surface and an offset surface of the second defined surface:
   means for calculating an intersection of a tool center path to machine the second defined surface and an offset surface of the first defined surface;
   means for generating a tool center path to create a connecting surface between the intersections; and
   means for machining the workpiece in accordance with the generated tool center path.

8. The three-dimensional machining apparatus of claim 7 wherein the tool center path to machine the first defined surface does not intersect with the tool center path to machine the second defined surface.

9. The three-dimensional machining apparatus of claim 7, wherein each of the intersection calculating means calculates intersections in accordance with Cauchy's method.

10. A three-dimensional machining apparatus for continuous machining of a first surface and a second surface of a workpiece, the three-dimensional machining apparatus comprising:
   (a) means for defining said first and second surfaces by
      defining two variations $\lambda$ and $\mu$, which are non-parametric with respect to a coordinate system, wherein $\lambda$ and $\mu$ fulfill the following condition:

$$0 \leq \lambda \leq 1$$

$$0 \leq \mu \leq 1,$$

defining a first plurality of curves extending in direction of $\lambda$, $c(\lambda,\mu_0)$, wherein $\mu_0$ is a constant value of $\mu$, defining a second plurality of curves extending in direction of $\mu$, $c(\lambda_0,\mu)$, wherein $\lambda_0$ is a constant value of $\lambda$, and forming said surfaces by said first and said second curves:

(b) means for defining, for each of said surfaces, a plurality of offset points, each of said offset points being defined by defining a point on one of said surfaces to be machined, and defining a distance from said point in direction of the normal of said point, said distance being the distance between a working end of a machine tool and a center of said machine tool;

(c) means for defining a first and a second offset surface by defining a first parallel surface that contains said offset points of said first surface, and defining a second parallel surfaces that contains said offset points of said second surface; and (d) means for defining a first tool center path for machining said first surface by connecting offset points of said first surface;

(e) means for defining a second tool center path for machining said second surface by connecting offset points of said second surface:

(f) means for calculating an intersection of said first tool center path and said offset surface of the second surface;

(g) means for calculating an intersection of said second tool ,center path and said offset surface of the first surface;

(h) means for generating a tool center path between said intersections for creating a connecting surface therebetween; and (i) means for machining the workpiece in accordance with the generated tool center path.

11. The three-dimensional machining apparatus of claim 10, wherein the tool center path to machine the first surface does not intersect with the tool center path to machine the second surface.

12. The three-dimensional machining apparatus of claim 10, wherein each of the intersection calculating means calculates intersections in accordance with Cauchy's method.

* * * * *